United States Patent [19]

Busse et al.

[11] 4,354,947

[45] Oct. 19, 1982

[54] PROCESS FOR FILTERING SLUDGE-LIKE MATERIALS IN A FILTER PRESS

[75] Inventors: Oswald Busse; Hugo Klesper, both of Aarbergen, Fed. Rep. of Germany

[73] Assignee: Passavant-Werke Michelbacher Huette, Fed. Rep. of Germany

[21] Appl. No.: 175,343

[22] Filed: Aug. 4, 1980

Related U.S. Application Data

[63] Continuation of Ser. No. 53,387, Jun. 29, 1979, abandoned.

[51] Int. Cl.³ ............................................. B01D 25/30
[52] U.S. Cl. ................................... 210/790; 210/808
[58] Field of Search ............... 210/416, 224, 225, 226, 210/227, 228, 229, 230, 767, 96 R, 790, 780, 808

[56] References Cited

U.S. PATENT DOCUMENTS

| | | | |
|---|---|---|---|
| 459,326 | 9/1891 | Wiesenbruk | 210/416 |
| 3,502,210 | 3/1970 | Busse et al. | 210/224 |
| 3,559,809 | 2/1971 | Barmore | 210/416 |
| 3,938,434 | 2/1976 | Cox | 210/225 |
| 4,067,807 | 1/1978 | Busse et al. | 210/225 |
| 4,151,080 | 4/1979 | Zuchemm | 210/96 R |

FOREIGN PATENT DOCUMENTS

| | | | |
|---|---|---|---|
| 2530550 | 1/1977 | Fed. Rep. of Germany | 210/224 |
| 1151028 | 5/1969 | United Kingdom | 210/224 |

*Primary Examiner*—Thomas G. Wyse
*Attorney, Agent, or Firm*—Woodford R. Thompson, Jr.

[57] ABSTRACT

A process and apparatus for the batch-wise filtering of a sludge-like material in which the discharge period of the filter press is used for filling a pressure vessel containing air with a pump being also used during this period. During the filtration period the pump can operate solely for feeding the filter press to thereby increase the filtration capacity and reduce the required filtration period. During the discharge period the pump also operates exclusively for feeding the pressure vessel to further speed up the process. The pump can operate continuously and the different steps of the process can be controlled by only opening and closing control valves.

2 Claims, 3 Drawing Figures

PROCESS FOR FILTERING SLUDGE-LIKE MATERIALS IN A FILTER PRESS

This is a continuation of application Ser. No. 053,387 filed June 29, 1979, now abandoned.

BACKGROUND OF THE INVENTION

This invention relates to a process for the batch-wise filtering of sludge-like materials in a filter press.

A similar process is disclosed in German patent DE-PS No. 1,461,452. An advantage is achieved by feeding sludge into a pressure vessel containing air and connected to a filter press in that the loading of the filter press at the commencement of each batch can be achieved very quickly by removing the sludge from the pressure vessel by means of the compressed air therein. In addition, a pump can also feed sludge into the filter press. After the initial rapid loading, during which the air pressure in the pressure vessels declines, the actual filtration process is carried out by further conveying of sludge into the filter press by the pump. The pump thereby causes pressure to increase continually in the filter press until finally a pressure limit is achieved and the filtration phase is completed.

The pressure vessel, partly emptied by the loading process, must be refilled by the conveying of sludge thereto before each next loading step. In the case of conventional processes this is carried out during the actual filtration phase in such a way that a part of the sludge conveyed by the pump into the filter press is again removed at a point distant from the feed point and passed into a pressure vessel containing air. An advantage arising out of this, lies in the fact that a strong flow is maintained during the filtration step which thus prevents the flow orifices in the filter press from becoming blocked. However, the conventional process has a disadvantage in that during the filtration phase only a part of the sludge conveyed by the pump is used for the filtration while another unused part is returned and again removed. This means that at a given pump capacity the filtration step is extended or the quantity of filtered sludge is reduced. Accordingly, the pump capacity is not used to the optimum degree.

Other known processes operating with pressure vessels containing air also have essentially the same disadvantages. However, they do not belong to the category mentioned above since in their case the pressure vessel is not used for the rapid loading of the filter press, but for the actual filtration process. According to German patent application No. DE-OS 1,536,874 two pumps are used, namely a low pressure pump for the initial loading of the filter press, and a high pressure pump for the concurrent filling of the pressure vessel containing air. During the actual filtration process both pumps are switched off and the filter press is fed with sludge from the pressure vessel containing air. In the case of the process according to German patent application No. DE-OS 2,530,550 the pump loads the filter press and also conveys further sludge during an initial stage of the filtration step, while at the same time sludge is removed again from the filter press and stored in the pressure vessel containing air. However, the sludge stored is not passed to the filter press at the next loading phase, since the sludge has already passed the filter press during the second stage of the filtration step. Accordingly, the pump is switched off immediately when a predetermined pressure limit is reached and filtration is continued under falling pressure with sludge flowing from the pressure vessel containing air. It will be noted that with both processes the pumps are kept in operation during only a relatively small part of the total filtration batch and thus are not used to the optimum degree.

Prior art systems having a pressure vessel communicating with a filter press are also shown in our prior U.S. Pat. Nos. 3,502,210 and 4,067,807.

SUMMARY OF THE INVENTION

The purpose of our invention is to produce a process and apparatus of the type described above during which the feed capacity of the pump is utilized as much as possible to thereby shorten the duration of each filtration charge and/or to filter more sludge during each charge. This task has been realized in accordance with our invention by utilizing the discharge period of the filter press for filling the pressure vessel with the pump being used also during this period. With prior art processes, on the other hand, the pumps are switched off during this period. During the filtration period the pump can operate solely for feeding the filter press to thus increase the filtration capacity and reduce the required filtration period. During the discharge period the pump also operates exclusively for feeding the pressure vessel, thus further speeding up the process, which can be completed in any case within the time required for the discharge and if necessary for cleaning the filter press. A particular advantage of our process is that the pump can run continuously and the different periods or steps can be controlled by only opening and closing the control valves.

DESCRIPTION OF THE DRAWINGS

Apparatus embodying features of our invention and which may be employed to carry out our improved process is illustrated in the accompanying drawings, forming a part of this application, in which.

DETAILED DESCRIPTION

Figure 1:
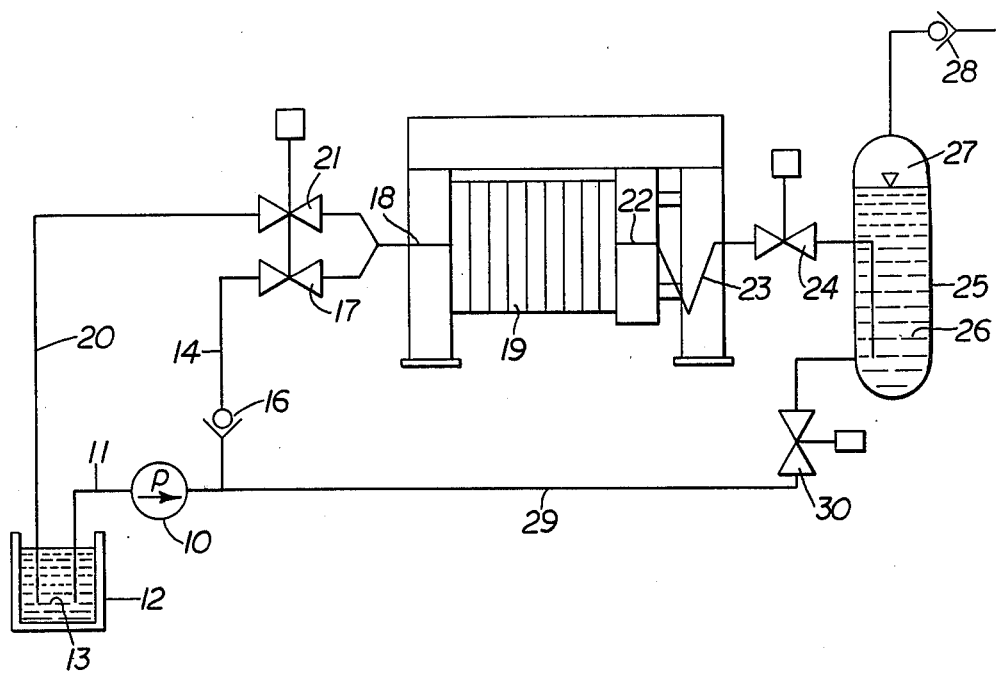
FIG. 1 illustrates a schematic arrangement of a filter press having a pump, air pressure vessel and connectng conduits.

Referring now to the drawings for a better understanding of our invention, we show in FIG. 1 a pump 10 connected by a sludge free conduit 11 to a collecting or storage container 12 for sludge or the like 13. The pump 10 conveys the sludge 13 by a conduit 14 having a non-return valve 16 and shut-off valve 17 therein to an entrance orifice 18 of a filter press 19. To empty or discharge the filter press 19 a conduit 20 having a shut-off valve 21 therein communicates the orifice 18 of the filter press 19 with the sludge container 12. On the side of the filter press 19 opposite the entrance orifice 18 is an opening 22 which is connected by a partly flexible conduit 23 and a shut-off valve 24 to a pressure vessel 25 containing air. The sludge in the vessel 25, indicated at 26, is under pressure from an air cushion 27 which is prevented from escaping by means of a non-return valve 28. The pressure side of the pump 10 is also connected to the pressure vessel 25 by a direct connecting conduit 29 having a shut-off valve 30 therein.

Figure 2:
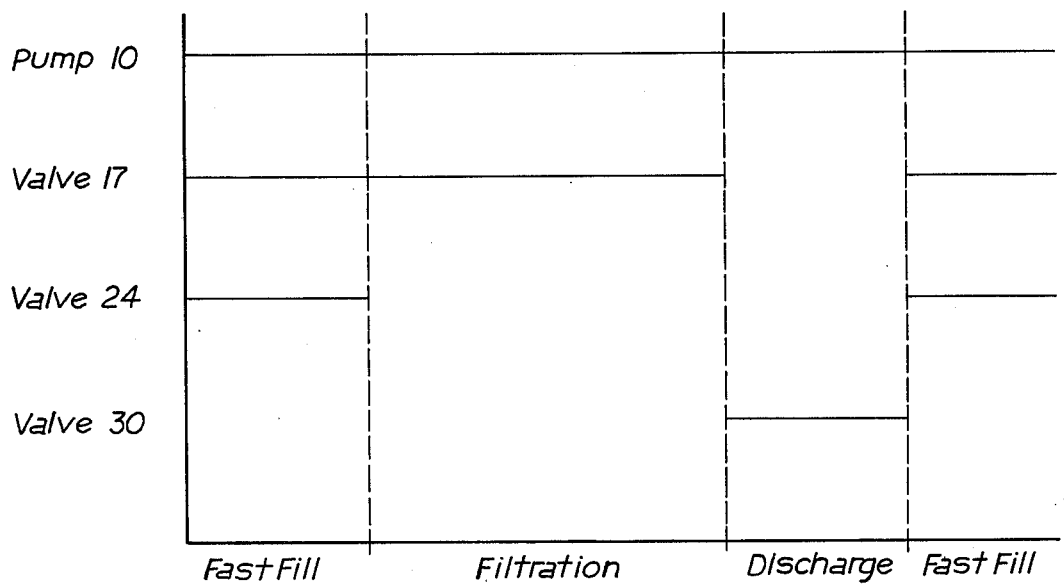
FIG. 2 shows a time program for operating conditions during the various steps of our process.

From the foregoing description the operation of our equipment and the manner in which our process is carried out will be readily understood. The equipment can be operated in the manner illustrated in FIG. 2 wherein the solid horizontal lines indicate when the pump 10 is switched on and the various valves are opened. A break in the horizontal line indicates that a valve is closed.

It is assumed that when the filtration batch commences, a sufficient quantity of sludge 26 is stored in the vessel 25 containing air under a sufficiently high pressure. To load the filter press 19, valves 17 and 24 are opened while valve 30 is closed. The sludge stored under pressure in the pressure vessel 25 flows under reduced pressure and at a gradually decreasing speed through the orifice 22 into the chambers of the filter press 19. At the same time pump 10 also conveys sludge into the filter press 19 through the entrance orifice 18 so that the filter press is quickly filled from both sides. This loading step ends immediately when the increasing pressure in the filter press 19 and the decreasing pressure in the vessel 25 have reached the same value and sludge is no longer removed from the vessel 25.

After the loading step the filtration step begins, during which the valve 24 is also closed. The sludge which is still being conveyed by the pump 10 at the entrance orifice 18 of the filter press 19 remains within the filter press 19 and is filtered whereby the pressure in the filter press 19 continues to increase. This filtration step ends when the pressure in the filter press 19 has reached an upper limiting value which in the case of conventional filter presses would be approximately 15 bars or atmospheres.

The emptying or discharge step follows the filtration step. In this step the valve 17 is also closed and valve 24 remains closed while the valve 30 and, if necessary, the valve 21 are opened. Pressure is soon released from the filter press 19 and the filter press can then be opened to eject the filter cake between the individual filter plates in the usual manner and, if necesssary, also to clean the filter cloths. However, during this period pump 19 still continues running and conveys the sludge into the pressure vessel 25 containing air by the conduit 29 so that the pressure vessel is again loaded and holds a sufficient quantity of sludge under sufficient pressure and is available for the next loading step.

Figure 3:
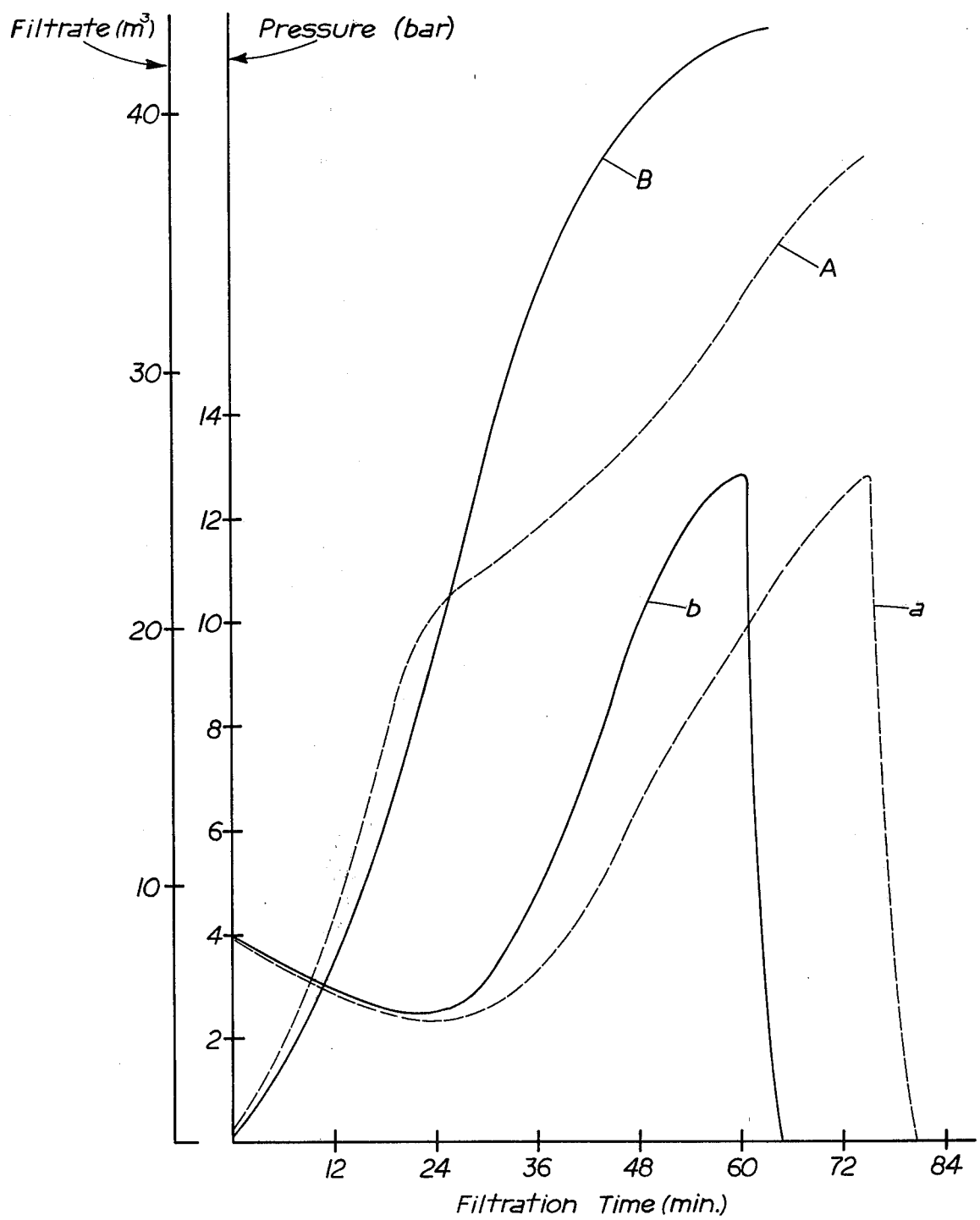
FIG. 3 illustrates graphically the filtration time and the pressure and the filtrate quantity obtained in accordance with the process of our invention as compared to known processes.

In FIG. 3 we show variations of pressure over the filtration period in the filter press by curves a and b, as well as the quantity of filtrate passing therethrough by curves A and B, in which the solid line curves b and B relate to the process according to oour invention and the dotted line curves a and A relate to the known or prior art process according to German patent No. DE-PS 1,461,452. From an observation of the pressure variation curves a and b, it will be seen that in the prior art process and the process according to our invention the variation is more or less the same up to the end of the loading step, which is approximately 24 minutes. Subsequently, however, with the prior art process, the pressure increase is considerably less since a part of the sludge is again removed and passed to the pressure vessel containing air. According to the process of our invention, as indicated by curve b, wherein the connection between the filter press 19 and the pressure vessel 25 is closed at the lowest point of the pressure curve, the pressure increases considerably more rapidly. With the example shown in FIG. 3, the highest pressure of 13 bars or atmospheres is already reached in 60 minutes with the process of our invention, while in the case of the prior art process it is not reached until approximately 15 minutes later or in a total time of 75 minutes. This represents a reduction of the filtration batch by approximately 25%.

In spite of this reduction in the filtration time the total quantity of filtrate passing through the filter press and thus the total dewatered quantity of sludge can be increased considerably as is shown by a comparison between the curves A and B. According to the prior art process only 38.5 m$^3$ of filtrate have been discharged from the filter press in 75 minutes. According to the process of our invention the filtrate quantity amounts to 43 m$^3$ after only 60 minutes, while in this same period of time only 33 m$^3$ of filtrate have been obtained with the prior art process. This represents an increase of almost 30%.

The invention is not limited to details of the example described above. For example, it is possible to connect the pressure vessel 25 to both sides of the filter press 19, the orifice 22 and the entrance orifice 18 by suitable conduits having control valves therein so that rapid loading from the vessel 25 can take place from both sides of the filter press 19. It is also possible to alter the process in such a way that during the rapid loading the valve 17 is closed and the valve 30 is opened so that rapid loading of the filter press 19 is effected exclusively from the pressure vessel 25 while the pump 10 pumps sludge during this time through the pipe 29 into the pressure vessel 25.

The valves 17, 24, and 30 should preferably be operated by a conventional central control unit, not shown, having suitable pressure sensors which effect the change-over from the rapid loading phase to the filtration phase. Closing of the valve 24 can be controlled by a suitable pressure sensor located in the filter press 19 and activated by a predetermined decrease in pressure. At the end of the filtration phase, the valve 17 is closed and the valve 30 is opened. Valve 30 can be controlled by a suitable pressure sensor activated by a predetermined increase in pressure in the filter press 19.

While we have shown our invention in but one form, it will be obvious to those skilled in the art that it is not so limited, but is susceptible of various changes and modifications without departing from the spirit thereof.

What we claim is:

1. A process for the batch-wise filtering of a sludge-like material in a filter press having a pump connected to the filter press for feeding the sludge-like material from a sludge-like material source into the filter press for filtration therein, and having a pressure vessel with an air cushion therein with said vessel being connected selectively to the filter press and to the pump and being periodically filled by the pump with sludge-like material under the pressure of said air cushion, with this sludge-material being stored in said vessel and fed into the filter press at the beginning of a filtering batch, each batch comprising the following steps in the sequence named:
   (a) loading said filter press with at least a portion of said sludge-like material being stored under pressure in said pressure vessel,
   (b) conveying sludge-like material by said pump from said sludge-like material source into the filter press for filtration therein, with the connection between said filter press and said pressure vessel being closed at least during the final stage of the filtration step,
   (c) closing the connection between said pump and said filter press and opening the connection between said pump and said pressure vessel while continuously running said pump to convey sludge-like material directly from said source into said pressure vessel, and (d) opening said filter press and discharging filter cake therefrom while continuing to supply sludge-like material to said pressure vessel with the connection between said pump and said filter press closed and the connection between said pump and said pressure vessel open.

2. The process as defined in claim 1 in which the continuously running pump is connected alternately with the filter press during said loading and filtration steps and with the pressure vessel during said discharging of said filter cake.

* * * * *